United States Patent
Mason

(10) Patent No.: US 9,009,799 B2
(45) Date of Patent: Apr. 14, 2015

(54) SECURE ACCESS

(75) Inventor: Jeremy R Mason, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 216 days.

(21) Appl. No.: 12/445,122

(22) PCT Filed: Oct. 5, 2007

(86) PCT No.: PCT/GB2007/003792
§ 371 (c)(1),
(2), (4) Date: Apr. 10, 2009

(87) PCT Pub. No.: WO2008/047074
PCT Pub. Date: Apr. 24, 2008

(65) Prior Publication Data
US 2010/0031332 A1 Feb. 4, 2010

(30) Foreign Application Priority Data

Oct. 17, 2006 (GB) .................................. 0620587.6

(51) Int. Cl.
*H04L 9/32* (2006.01)
*H04L 29/06* (2006.01)

(52) U.S. Cl.
CPC .............. *H04L 63/08* (2013.01); *H04L 9/3226* (2013.01); *H04L 63/083* (2013.01); *H04L 63/102* (2013.01)

(58) Field of Classification Search
CPC ........... G06F 21/31; G06F 21/41; H04L 9/32; H04L 9/3226
USPC ........................................................ 726/6, 8
See application file for complete search history.

(56) References Cited

U.S. PATENT DOCUMENTS

| 6,275,944 | B1 * | 8/2001 | Kao et al. .......................... 726/36 |
| 7,137,141 | B1 * | 11/2006 | McClanahan ..................... 726/8 |
| 7,150,038 | B1 * | 12/2006 | Samar ................................ 726/8 |
| 2002/0078386 | A1 | 6/2002 | Bones et al. |
| 2002/0112045 | A1 | 8/2002 | Nirkhe et al. |

(Continued)

FOREIGN PATENT DOCUMENTS

| EP | 1 045 566 | 10/2000 |
| EP | 1 705 598 | 9/2006 |

(Continued)

OTHER PUBLICATIONS

UK Search Report dated Dec. 20, 2006 for GB 0620587.6.

(Continued)

*Primary Examiner* — Kaveh Abrishamkar
*Assistant Examiner* — Ngoc D Nguyen
(74) *Attorney, Agent, or Firm* — Nixon & Vanderhye PC

(57) ABSTRACT

Secure access to a resource is provided by receiving a user request associated with a username for access for a resource and checking the username associated with the request against a reference username associated with the user. The reference username is linked to a second username associated with the user. If the received username matches the reference username, the request is modified by replacing the received username with the second username, and the modified request is forwarded towards the resource. A new username can be recorded upon receiving a request for the user. In response to the received request, the new username is recorded at a reference location linked to the location of the second username.

7 Claims, 1 Drawing Sheet

(56) References Cited

U.S. PATENT DOCUMENTS

| | | | |
|---|---|---|---|
| 2003/0018919 A1 | | 1/2003 | Arbab et al. |
| 2004/0059636 A1* | | 3/2004 | McClung et al. ............... 705/26 |
| 2004/0083297 A1* | | 4/2004 | Gazzetta et al. ............. 709/229 |
| 2004/0260942 A1 | | 12/2004 | Jamieson et al. |
| 2004/0260953 A1 | | 12/2004 | Jamieson et al. |
| 2005/0210270 A1* | | 9/2005 | Rohatgi et al. ............... 713/186 |
| 2007/0101440 A1* | | 5/2007 | Bhatia et al. ..................... 726/28 |
| 2008/0127331 A1* | | 5/2008 | Seidman et al. ................ 726/21 |

FOREIGN PATENT DOCUMENTS

| | | |
|---|---|---|
| EP | 1 705 598 A2 | 9/2006 |
| WO | 2005/032041 A1 | 4/2005 |

OTHER PUBLICATIONS

International Search Report for PCT/GB2007/003792 mailed Dec. 27, 2007and Written Opinion of the International Searching Authority.

IPER for PCT/GB2007/003792 dated Apr. 22, 2009.

"Security Fundamentals," bea, printed from the Internat at http://e-docs.bea.com/wls/docs81/secintro/concepts.html, pp. 1-20.

"Security Realms," bea, printed from the Internet at http://e-docs.bea.com/wls/docs81/secintro/realm_chap.html, pp. 1-12.

"Security," WebSphere Portal, printed from the Internet at http://wps2a.semi.org/wps/doc/en/InfoCenter/wpf/security.html, pp. 1-5.

"Introduction to WebLogic Security," bea.

"2.1 Overview of LDAP architecture," IBM.

"Java and Security, Part 1," book extract: "WebLogic: The Definitive Guide," O'Reilly.

"Java and Security, Part 2," book extract: "WebLogic: The Definitive Guide," O'Reilly.

Mehta, "Oracle Database Security," Information Systems Security, pp. 40-52.

International Search Report for PCT/GB2007/003792 mailed Dec. 27, 2007.

* cited by examiner

SECURE ACCESS

CROSS-REFERENCE TO RELATED APPLICATIONS

This application is the U.S. national phase of International Patent Application No. PCT/GB2007/003792 filed 5 Oct. 2007, which designates the U.S. and claims priority based on GB 0620587.6 filed 17 Oct. 2006, the entire contents of both of which are incorporated herein by reference.

BACKGROUND AND SUMMARY

1. Technical Field

The invention relates to the field of network security and, in particular, has application to secure access to resources in a network.

In the following, authentication is used to denote verification of the identity of a person, program or device. Authorization is used to denote deciding if a person, program or device is allowed to have access to a resource (data, functionality or service). The invention has particular application to resources accessed via a network and identified by a universal resource locator (URL).

2. Related Art

Large organizations typically support a multitude of diverse directories or databases for separate applications. Within large organizations there can be a number of directories for user identity data which are not consolidated owing to fundamental incompatibilities resulting from their having being produced and developed independently of each other. Directory mapping can be used to support single sign-on (SSO) between various web sites using such disparate directories. For example, SSO is currently provided between the BT.com web site and the web customer relationship management (CRM) application Siebel 7 using a directory mapping. SiteMinder ensures that the user is correctly logged into Siebel using the authorized user (e.g. Siebel User ID: SMITHSONJR), rather than the authenticated user (BT.com user name: jeremy.r.smithson@bt.com). Netegrity® SiteMinder is a commercially available access management system featuring policy-based authentication and authorization management and supporting single sign-on.

A given web site may use one or more databases to support its operation. In the case of a web site using the WebLogic application server, a single database may contain multiple copies of the username (in multiple tables). Some web sites are also dependent on services provided by supporting systems and databases that contain additional copies of the username. The proliferation of multiple copies of a username leads to problems when a user wishes to change their user name. To implement a username change requires each copy of the username to be changed across all databases and systems that store the username. This includes the application server database and supporting databases.

A user might change username, for example, if an email address is used as a username and the user's email address has changed. In this case the user will wish to change username to align with the new email address. Alternatively, a user might change their username as part of plan to migrate all usernames from using email address to using non-email addresses. There is therefore a requirement to facilitate username changes.

BRIEF SUMMARY

A method for changing a username for secure access to a resource in a network is proposed including: recording at a first location in a directory a first username identifying a user; receiving a request from the user to record a new username; in response to the received request, recording the new username at a second location linked to the first location; receiving a user request comprising a username to access the resource, checking the received username against the new username; and, if the received username matches the new username, forwarding the request to the resource together with the first username.

The directory may include either an authentication directory or an authorization directory. Other aspects may also include: detecting that the username received in the request does not match the new username; checking the received username against the first username; and if the received username matches the first username, forwarding the request to the resource together with the first username.

The exemplary method may include receiving a request from the user to record a second new username; in response to the received request, recording the second new username at the second location overwriting the new username; and leaving the first username recorded in the first location unchanged.

The exemplary embodiment may include recording a password for the user at a location in the directory linked with the two locations for usernames associated with the user; receiving a password associated with the request; checking the received password against the recorded password; in which the forwarding step is contingent on matching the received password with the recorded password.

The invention also provides a server for providing secure access to a resource in a network; in which the server is arranged to receive from a user a request associated with a first username identifying the user to record a second username for identifying the user; in which the server is arranged to request from a policy server verification of the user's identity and authorisation of the user's request to record on the basis of the first username; in which the server is arranged upon receiving the requested verification and authorization to forward the second username for recording in association with the first username.

According to an aspect of the invention the server is arranged to receive from the user a request associated with the second username to access the resource; in which the server is arranged to request from the policy server verification of the user's identity and authorisation of the user's request to access the resource on the basis of the second username; in which the server is arranged upon receiving the requested verification and authorization to forward the authorized request to access the resource together with the first username towards the resource.

A system is proposed for providing secure access to a resource in a network, the system comprising: a database for recording at a first location a username associated with a user; a server for receiving a request to record a second username for identifying the user; and for obtaining authorization of the request on the basis of the first username; an application server, in which the server is arranged to forward the authorized request to the application server and in which the application server is arranged to instruct the database to record the second username at a location linked to the first location; in which the server is arranged to receive a request from the user to access a resource and to obtain authorization of the request on the basis of the second username; in which the server is arranged to forward the authorized request to access a resource together with the first username towards the resource.

The invention also provides a directory comprising a first location for recording a first username for verifying the identity of a user; and a second location linked to the first location for recording a second username for verifying the identity of the user; in which the first username is arranged to verify the identity of a user originating a request to access a resource and the second username is arranged to be forwarded towards the resource with the request from a user whose identity has been verified against the first username.

The exemplary embodiment may also provide a method for secure access to a resource including: receiving a user request associated with a username for access to a resource; checking the username associated with the request against a reference username associated with the user; in which the reference username is linked to a second username associated with the user; if the received username matches the reference username, modifying the request by replacing the received username with the second username; and forwarding the modified request towards the resource.

The exemplary embodiment may also include changing the reference username to a new value; receiving a user request comprising a username; checking the received username against the changed reference username; if the received username matches the changed reference username, modifying the request by replacing the received username with the second username; and forwarding the modified request towards the resource.

The exemplary embodiment may also include recording a reference password, the reference username and the second username at linked locations in a directory; receiving with the request a password together with the username; checking the received password against the reference password; in which the forwarding step is contingent on matching the received password with the recorded password.

BRIEF DESCRIPTION OF THE DRAWINGS

To aid understanding of the invention, embodiments will now be described by way of example, with reference to the drawings in which.

DETAILED DESCRIPTION OF EXAMPLE EMBODIMENTS

Figure 1:
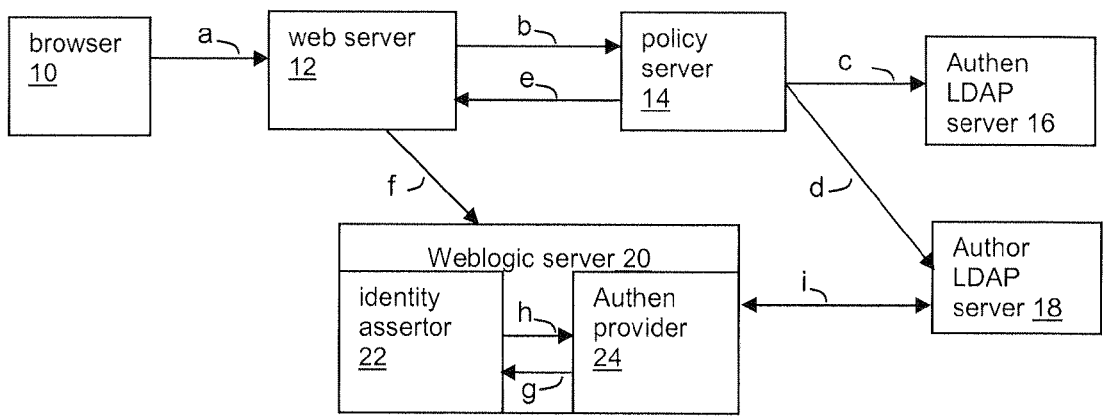
FIG. 1 shows a block diagram of a conventional system for providing secure access to a resource.

A conventional system for providing secure access to a resource will first be described with reference to FIG. 1. FIG. 1 shows a conventional identity assertor system based on the SiteMinder system.

The conventional identity assertor system according to FIG. 1 comprises browser 10 through which a user of the system (not shown) accesses functionality provided by Weblogic server 20. The user connects via web server 12 which hosts one or more web agents (not shown). The user's rights and privileges with regard to access to resources is policed by policy server 14 in communication with authentication lightweight directory access protocol (LDAP) server 16 and authorization lightweight directory access protocol (LDAP) server 18. If policy server 14 finds the user is entitled to access the requested resource, the web server 12 forwards the request to Weblogic server 20. Weblogic server 20 comprises identity assertor 22 and LDAP authentication provider 24 which is, itself, connected to authorization LDAP server 18.

Authentication LDAP server 16 comprises a database of information on authenticated users. Authorization LDAP server 18 comprises a database of information on authorized users. Alternatively, the information on authenticated or authorized users could be provided by RDBMS servers in an alternative, conventional arrangement.

Operation of the system of FIG. 1, according to which a user attempts to access a secure resource, will now be described.

Before the steps leading to access to a secure resource are described, we need to say something about sessions. In the Siteminder system discussed here, requests are made by the user as part of one or more sessions. A session is initiated by a user (not shown) submitting a request comprising a username identifying the user and an optional password. Before the session is set up, the username submitted with the request is forwarded to an authentication and authorization authority represented in FIG. 1 by policy server 14 and databases 16 and 18. Policy server 14 authenticates the submitted username by checking against authenticated usernames held in a database, such as an authentication LDAP server 16. Once the user has been authenticated, policy server 14 provides the user with an encrypted cookie that contains information identifying the user. On receipt, the cookie is stored by the user's browser 10. The browser sends the cookie with each subsequent communication from the user forming part of that session. Each cookie received from the user's browser 10 by web server 12 is forwarded to policy server 14 where it is decrypted so as to allow the user to be securely identified.

Access to a secure resource as part of an established session will now be described with reference to FIG. 1: The steps are described in sequence with index letters corresponding to the relevant flow arrows shown in FIG. 1.

a). A Siteminder authenticated user (not shown) requests via browser 10 a protected resource, typically a URL or information identified by a URL. As outlined, above, each request is accompanied by a cookie identifying the user.

b). A web agent operating on web server 12 sends the user cookie received from the user's browser 10 to policy server 14 for validation.

c). Policy server 14 decrypts the cookie to obtain the user's identity and validates the user identified in the cookie against security data held by the authentication LDAP server 16. Once the policy server 14 has validated the user's token against the data held by authentication LDAP 16 (i.e. established the identity of the user), it exploits a mapping between LDAP servers to locate the corresponding entry in the authorization LDAP server 18.

d). In response to the authorization request, a set of profile attributes including the WebLogic username are returned from authorization LDAP 18 to the Policy Server 14.

e). The policy server 14 returns the profile attributes to the web agent.

f). If the policy server 14 determines that the user is authorised to access the resource, the web agent uses the received profile attributes to inject appropriate user attributes into a request HTTP stream (e.g. http://www.w3.org/Protocols/rfc2616/rfc2616-sec5.html) and forwards the request to a WebLogic proxy module (not shown) plugged into web server 12 which in turn forwards the request to the application server hosting the requested resource, in this case, WebLogic server 20. In order to convey the WebLogic username in the request forwarded from the Web Server to the application server, an HTTP header variable which contains the desired WebLogic username is injected in the request HTTP stream. The header name may be plaintext or the output of an active response that encrypts the desired attribute value with a user specified key.

g). The requested resource is protected in WebLogic server 20 by the "CLIENTCERT" method (i.e. identity assertion based on values from an external input such as request headers), in the conventional manner, which causes the LDAP authentication provider 24 in WebLogic server 20 to request the username from the configured SiteMinder user map identity assertor 22.

h). The identity assertor 22 is activated by receipt of the HTTP header. The identity assertor attempts to decrypt the header value (as appropriate) and extracts the authorized username from the header and, if successful, returns the extracted and (optionally) decrypted data as the username to the LDAP authentication provider 24.

i). The Authentication Provider 24 validates the (optionally) decrypted username received from Identity Assertor 22 against the configured authorization LDAP 18 store and, if successful, effectively logs the user into WebLogic so that all subsequent requests will be processed as a logged-in user. If the username is not found in the authorization LDAP 18, authentication will fail.

The above reference to the prior art is given for the purposes of providing background to the present invention and is not to be taken as an indication that the content of the prior art described constitutes common general knowledge.

A system for providing secure access to a resource according to an embodiment of the invention will now be described with reference to FIG. 2. As in FIG. 1, in FIG. 2 we have browser 10, web server 12 comprising a web agent (not shown) and proxy module (not shown), policy server 14, WebLogic application server 20 comprising custom identity assertor 22 and authentication provider 24 interconnected in similar fashion to the arrangement of FIG. 1. According to FIG. 2, policy server 14 and authentication provider 24 are not connected to LDAP servers 16 and 18 but are connected to user-record database 30. Unlike the conventional database of FIG. 1, the user-record database 30 has provision for two usernames per user: a first username that the user is unable to modify, i.e. the "immutable" username; and a second username that the user is able to modify, i.e. the "modifiable" username. One or both usernames may be present, as described later. The term "immutable" is not used to imply anything more than that the user does not have write access to the first username and is not used here to imply any general read-only or write-once status.

Figure 2:
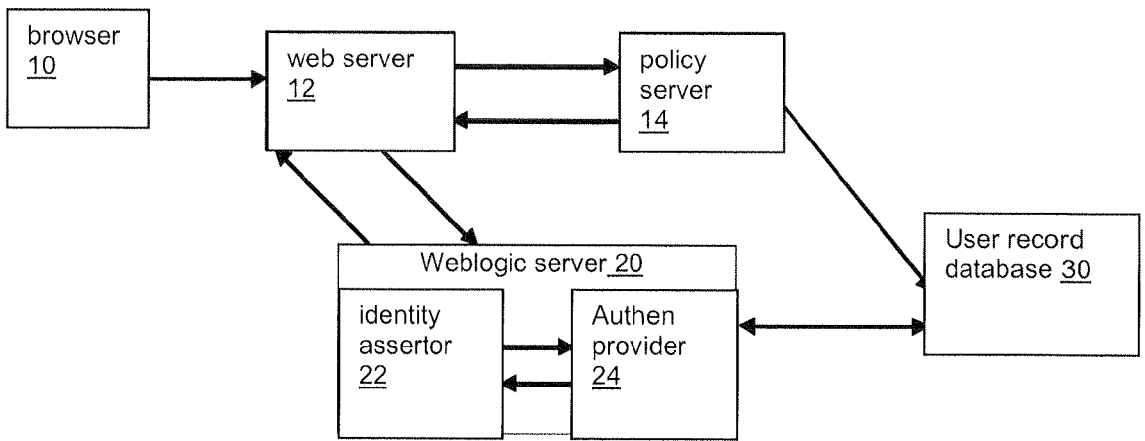
FIG. 2 shows a block diagram of a system for providing secure access to a resource according to an embodiment of the invention.

As shown in FIG. 2, a SiteMinder authenticated user (not shown) attempts to access, via browser 10, Weblogic application server 20 to request a protected resource, typically a URL or information identified by a URL. As before the request is accompanied by a cookie identifying the user but, according to the present invention, the user can make the request using, in combination with an optional password, either of two usernames recorded for that user in user record database 30, i.e. a modifiable username or an immutable username.

Access to a secure resource as part of an established session, according to the invention, will now be described in detail with reference to FIG. 2:

a). A Siteminder authenticated user (not shown) requests via browser 10 a protected resource, typically a URL or information identified by a URL. Each request is accompanied by a cookie identifying the user. According to the invention, the cookie may contain one of two usernames identifying the user.

b). A web agent operating on web server 12 sends the user cookie received from the user's browser 10 to, policy server 14 for validation.

c). Policy server 14 decrypts the cookie to obtain the user's identity and validates the user identified in the cookie by authenticating the username carried in the cookie against authentication data held by the user-record database 30. Once the policy server 14 has validated the username carried in the cookie against the authentication data held by user-record database 30 (i.e. establishing the identity of the user), it locates the corresponding authorization entry in the user-record database 30 d). In response to the validation request, a set of profile attributes including the first username are returned from user-record database 30 to the Policy Server 14.

e). The policy server 14 returns the profile attributes including the first username to the web agent.

f). If the policy server 14 determines that the user is authorised to access the requested resource, the web agent via WebLogic proxy module (not shown) forwards, in a similar manner to before, the request to WebLogic server 20. In this case, irrespective of the username used to validate the user, the request is accompanied by the first username as an HTTP header variable injected in the request HTTP stream. As before, the header name may be plaintext or encrypted.

g). The requested resource is protected in WebLogic server 20 by the "CLIENTCERT" method which causes the authentication provider 24 in WebLogic server 20 to request the username from the configured SiteMinder user map identity assertor 22.

h). As before, the identity assertor 22 is activated by receipt of the HTTP header. The identity assertor decrypts the header value (as appropriate) and extracts the authorized username from the header for forwarding to the Authentication Provider 24.

i). The authentication provider 24 validates the (optionally) decrypted username received from identity assertor 22 against the user record database 30 and, if successful, effectively logs the user into WebLogic so that all subsequent requests will be processed as a logged-in user. The authentication provider validates the authorized username derived from the header against the immutable username stored in the user-record database. It does not validate the username against the modifiable username. If the received username is not found in the user-record database 30, authentication will fail.

According to one embodiment, the user-record database acts as both authentication and authorization directory as well as the user-record database for WebLogic application server 20. According to an alternative embodiment, the authentication and authorization directories may be hosted separately from the user-record database.

According to a preferred embodiment of the present invention, the user-modifiable username comprises the authenticated username and the immutable username comprises the authorized username. If, for example, the user attempts to log on to BT.com using a password and modifiable BT.com username, the modifiable BT.com username is mapped in user record database 30 to the immutable BT.com username.

Alternatively, if the user attempts to log on to BT.com using a password and the immutable BT.com username, no directory-mapping is required.

Initially, the user may only have one username (the first username) recorded and will be able to request the recording of the second username. The request to record will be treated in a similar way to any request to access a secure resource and will require the first username identifying the user to be validated, as set out above with reference to FIG. 2.

Two options for recording a second username according to the present invention will now be described.

According to option 1, the modifiable username myusername2 is recorded only when the user requests a change of modifiable username. Prior to the initial request for a change of username, no modifiable username is recorded for that user. The following table describes user attributes before and after username change when, prior to the first username change, the "modifiable username" field is empty.

| Before username change | | After username change | |
|---|---|---|---|
| Modifiable Username | Immutable Username | Modifiable Username | Immutable Username |
| | myusername | myusername2 | myusername |

According to option 2, the modifiable username myusername2 is recorded as a one-off migration activity. Prior to the initial request for a change of username, the recorded modifiable username is a copy of the immutable username myusername. The following table describes user attributes before and after username change when the modifiable username is set as a one-off migration activity.

| Before username change | | After username change | |
|---|---|---|---|
| Modifiable Username | Immutable Username | Modifiable Username | Immutable Username |
| myusername | myusername | myusername2 | myusername |

According to further embodiments of the present invention, two options for managing namespaces for containing usernames are described, below.

According to namespace option 1, both the modifiable and immutable usernames are contained within a single namespace. The solution takes the existing namespace comprising the immutable usernames and makes this a subset of a newly defined namespace, where the superset, newly defined namespace, includes both the immutable and modifiable usernames.

According to namespace option 2, the modifiable and immutable usernames are contained in two separate namespaces. The immutable usernames are contained within the original namespace. A second namespace of modifiable usernames is added. Usernames in the second namespace while unique in the second namespace may have duplicates in the original namespace. The namespaces are two sets that may intersect. Ambiguity between the two namespaces where intersected can be resolved by using a combination of both username and password—this combination being set up at the time of authentication.

The solution facilitates changing usernames. Advantageously, only the modifiable username is changed and the immutable username is not changed. This allows the user to change the username it uses to access resources without necessitating any databases that store only copies of the immutable username to change.

As will be understood by those skilled in the art, the invention may be implemented in software, any or all of which may be contained on various transmission and/or storage mediums such as a floppy disc, CD-ROM, or magnetic tape so that the program can be loaded onto one or more general purpose computers or could be downloaded over a computer network using a suitable transmission medium. The computer program product used to implement the invention may be embodied on any suitable carrier readable by a suitable computer input device, such as CD-ROM, optically readable marks, magnetic media, punched card or tape, or on an electromagnetic or optical signal.

Those skilled in the art will appreciate that the above embodiments of the invention are greatly simplified. Those skilled in the art will moreover recognise that several equivalents to the features described in each embodiment exist, and that it is possible to incorporate features of one embodiment into other embodiments. Where known equivalents exist to the functional elements of the embodiments, these are considered to be implicitly disclosed herein, unless specifically disclaimed. Accordingly, the spirit and scope of the invention is not to be confined to the specific elements recited in the description but instead is to be determined by the scope of the claims, when construed in the context of the description, bearing in mind the common general knowledge of those skilled in the art.

In particular, the skilled reader would appreciate that the user-record database may be arranged as both authentication and authorization directory as well as the user-record database and that the authentication and authorization directories may equally be hosted separately from the user-record database. The skilled reader would appreciate that the database could be implemented as LDAP, relational or other, proprietary, structure without diverging from the scope of the present invention. Although embodiments have been described with reference to the Siteminder system, the skilled reader would appreciate that the invention has application to other forms of identity assertion system. The skilled reader would realise that association of the user's identity with the user's request is not restricted to use of an accompanying cookie and would appreciate that alternatively means could be used for establishing a suitable association, including using a URL parameter, without diverging from the scope of the present invention.

The content of the attached abstract is incorporated herein, as follows. A method for secure access to a resource including the steps of receiving a user request associated with a username for access to a resource; checking the username associated with the request against a reference username associated with the user; in which the reference username is linked to a second username associated with the user; if the received username matches the reference username, modifying the request by replacing the received username with the second username; and forwarding the modified request towards the resource. A new username can be recorded upon receiving a request from the user. In response to the received request, the new username is recorded at a reference location linked to the location of the second username.

The invention claimed is:

1. A server device for providing secure access to a protected resource in a network, wherein the server device is arranged to:
   receive from a user a request associated with a first username for access to the protected resource, the first username being an immutable username;
   request from a policy server verification of the user's identity and authorization of the user's request for access to the protected resource on the basis of the first username;
   upon receiving the requested verification and authorization, forward the authorized request for access to the protected resource and its associated first username towards the protected resource;

receive from the user a request associated with the first username identifying the user to record a second username for identifying the user, the second username being a modifiable username;

request from the policy server verification of the user's identity and authorization of the user's request to record on the basis of the first username;

upon receiving the requested verification and authorization, forward the second username for recording in association with the first username;

receive from the user a request associated with the second username for access to the protected resource;

request from the policy server verification of the user's identity and authorization of the user's request for access to the protected resource on the basis of the second username; and upon receiving the requested verification and authorization, modify the request by replacing the second username with the first username and forward the modified authorized request for access to the protected resource towards the resource.

2. A method of providing secure access to a protected resource in a network, comprising, at a server device:

receiving from a user a request associated with a first username for access to the protected resource, the first username being an immutable username;

requesting from a policy server verification of the user's identity and authorization of the user's request for access to the protected resource on the basis of the first username;

upon receiving the requested verification and authorization, forwarding the authorized request for access to the protected resource and its associated first username towards the protected resource; and receiving from the user a request associated with the first username identifying the user to record a second username for identifying the user, the second username being a modifiable username;

requesting from the policy server verification of the user's identity and authorization of the user's request to record on the basis of the first username;

upon receiving the requested verification and authorization, forwarding the second username for recording in association with the first username; and receiving from the user a request associated with the second username for access to the protected resource;

requesting from the policy server verification of the user's identity and authorization of the user's request for access to the protected resource on the basis of the second username; and upon receiving the requested verification and authorization, modifying the request by replacing the second username with the first username and forwarding the modified authorized request for access to the protected resource towards the resource.

3. A method comprising:

securing access to a protected resource hosted on an application server, comprising:

in a data store of a policy server, recording for a user respective security data including a respective first username recorded in a list of authenticated first usernames, and also recording an indication of the user's authorization for access to protected resources hosted on the application server and for recording a new username, the first username being an immutable username;

at a web agent, receiving from a user a first request for access to the protected resource together with an identity of the user;

sending from the web agent to the policy server a request for authentication of the user's identity and authorization of the user's request for access to the protected resource on the basis of the first username;

at the policy server, if the user's identity is validated against the user's security data and the user is indicated to have authorization to access the protected resource, sending to the web agent a positive response to that request for authentication and authorization including the first username;

at the web agent, associating with the first request the first username received from the policy server and sending the first request and its associated first username to the application server; and at the application server, receiving the first request and its associated first username, and providing access to the protected resource;

enabling the user to continue access to the protected resource using a new username, comprising:

at the web agent, receiving from the user a username record request together with an identity of the user to record a new username for the user, the new username being a modifiable username;

sending from the web agent to the policy server a request for authentication of the user's identity and authorization of the user's request to record a new username on the basis of the first username;

at the policy server, if the user's identity is validated against the user's security data and the user is indicated to have authorization to record a new username, sending to the web agent a positive response to that request for authentication and authorization, receiving from the web agent a new username, modifying the user's security data by recording the new username in the data store and linking the recorded new username to the recorded first username in the list of authenticated first usernames;

at the web agent, receiving from the user a second request for access to the protected resource together with an identity of the user in the form of the user's new username;

sending from the web agent to the policy server a request for authentication of the user's identity and authorization of the user's request for access to the protected resource on the basis of the new username;

at the policy server, if the user's identity is validated against the user's recorded security data and, on the basis of the linked recorded first username the user is indicated to have authorization to access the protected resource, sending to the web agent a positive response to that request for authentication and authorization including the first username;

at the web agent, associating with the second request the first username received from the policy server and sending the second request and its associated first username to the application server; and at the application server, receiving the second request and its associated first username, and providing access to the protected resource.

4. A method as claimed in claim 3, wherein the user's identity received at the web agent with the first request for access to the protected resource is in the form of the user's first username.

5. A method as claimed in claim 3, in which the provision of access to the protected resource is contingent on the application server successfully verifying with the policy server the authenticity of the first username received with the request for access.

6. A method as claimed in claim 3, further comprising:
at the policy server:
recording a password for the user in the data store and linking the recorded password with the recorded first username for the user;
receiving from the web agent a password associated with a request received from the user; and
checking the received password against the recorded password;
in which sending the first username from the policy server to the web agent is contingent on matching the received password with the recorded password.

7. A non-transitory computer-readable storage medium containing processor executable instructions which, when executed on a computer, provide operation for providing secure access to a protected resource in a network, comprising:
receiving from a user a request associated with a first username for access to the protected resource, the first username being an immutable username;
requesting from a policy server verification of the user's identity and authorization of the user's request for access to the protected resource on the basis of the first username;
upon receiving the requested verification and authorization, forwarding the authorized request for access to the protected resource and its associated first username towards the protected resource; and
receiving from the user a request associated with the first username identifying the user to record a second username for identifying the user, the second username being a modifiable username;
requesting from the policy server verification of the user's identity and authorization of the user's request to record on the basis of the first username;
upon receiving the requested verification and authorization, forwarding the second username for recording in association with the first username; and
receiving from the user a request associated with the second username for access to the protected resource;
requesting from the policy server verification of the user's identity and authorization of the user's request for access to the protected resource on the basis of the second username; and
upon receiving the requested verification and authorization, modifying the request by replacing the second username with the first username and forwarding the modified authorized request for access to the protected resource towards the resource.

\* \* \* \* \*